United States Patent [19]
Alexander

[11] 3,818,327
[45] June 18, 1974

[54] MEASURING GAUGE WITH SUPPORT FOR HOLDING MEASURED SHEET AND DISCHARGING FOREIGN MATTER

[75] Inventor: Allen Dean Alexander, Columbus, Ohio

[73] Assignee: Industrial Nucleonics Corporation, Columbus, Ohio

[22] Filed: Sept. 5, 1972

[21] Appl. No.: 286,075

[52] U.S. Cl. .... 324/34 TK, 33/147 L, 179/100.2 P, 269/21, 340/174.1 E
[51] Int. Cl. ............................................. G01v 33/12
[58] Field of Search ...................... 324/34 TK, 61 P; 179/100.2 P; 33/147 N, 147 L; 340/174.1 E; 308/DIG. 1; 269/21

[56] References Cited
UNITED STATES PATENTS
3,617,872  11/1971  Horn et al. ...................... 324/34 TK OTHER PUBLICATIONS
Mechanical Engineers' Handbook; McGraw Hill Book Co., N.Y. 1951 (5th Ed.) pp. 1,830, 1,831, 1,832, 1,871 and 1,872.

*Primary Examiner*—Robert J. Corcoran
*Attorney, Agent, or Firm*—William T. Fryer, III

[57] ABSTRACT

A gauge is provided for measuring a particular property of a moving sheet or web of material. In a preferred embodiment, an air caliper gauge for measuring the thickness of sheet material comprises a sensing element floating on an air film at a constant distance above the sheet and a sheet support below and in contact with the sheet. The sensing element and the sheet support form part of a transducer circuit providing an indication of the sheet thickness. Suction, which is applied to the sheet through apertures in a surface of the sheet support to maintain the sheet in a stable condition while it is measured, is produced by pressure-reducing structure within the sheet support responsive to a source of compressed air and functioning as a Venturi system. Foreign matter entering the pressure-reducing structure through the apertures in the support surface is ejected. Accordingly, the accumulation of such matter is suppressed, the efficiency of the pressure-reducing structure in providing suction to the sheet is kept unimpaired, and the accuracy of the gauging system is maintained.

15 Claims, 1 Drawing Figure

PATENTED JUN 18 1974 3,818,327
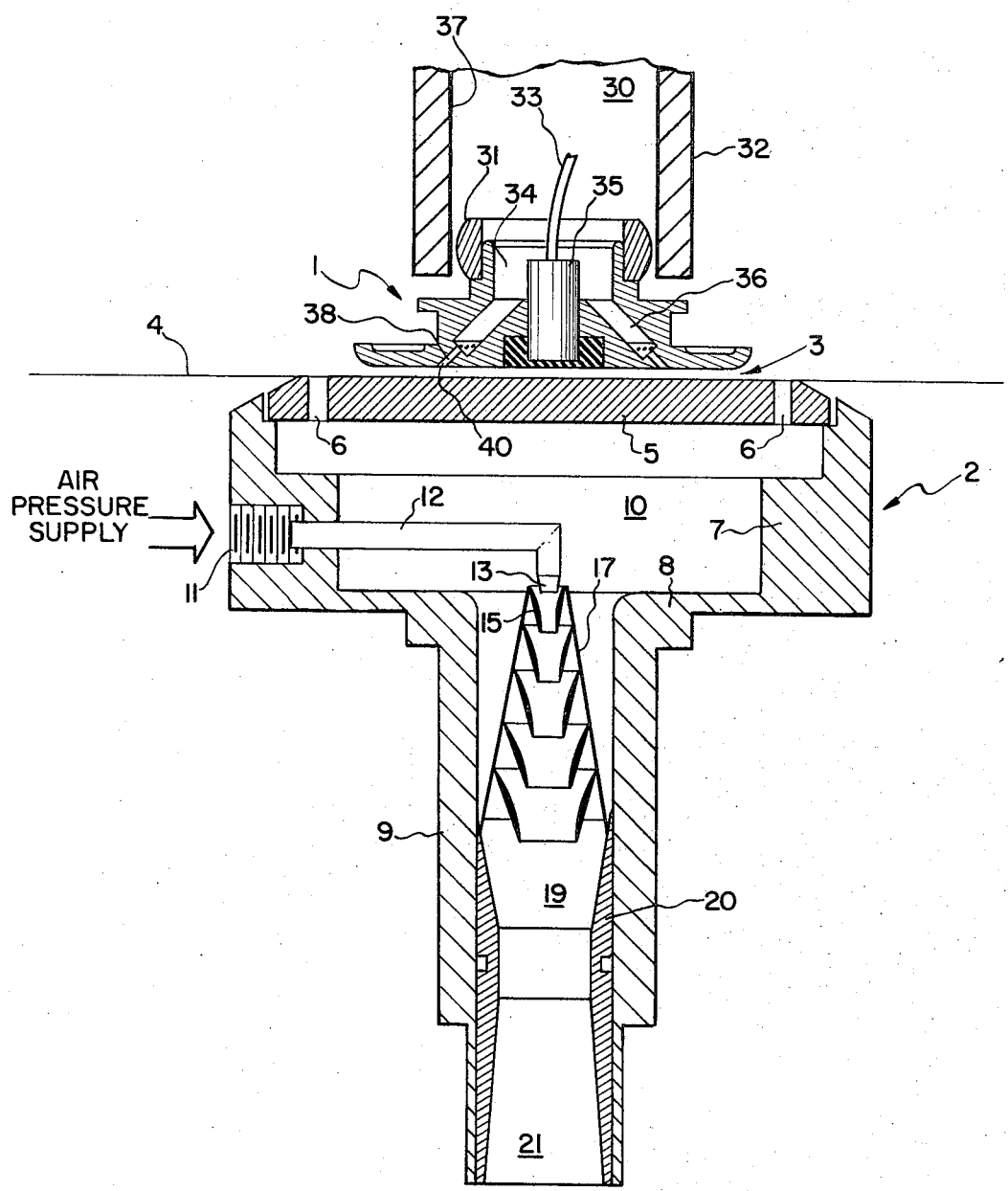

MEASURING GAUGE WITH SUPPORT FOR HOLDING MEASURED SHEET AND DISCHARGING FOREIGN MATTER

The present invention relates generally to measuring a particular property of material, and more specifically, to an apparatus for measuring a property of a moving material sheet or web wherein the sheet or web is maintained in substantial contact with a support member or an element of the measuring apparatus by means of negative gas pressure, i.e. suction.

CROSS REFERENCE TO RELATED APPLICATIONS

The present invention is related to the invention disclosed in the copending application Ser. No. 286,076, entitled "MEASURING GAUGE WITH AIR BEARING AND RESISTANT TO TILT."of Juan H. Crawford, assigned to the assignee of the present invention and filed on even date herewith.

BACKGROUND

A typical application of the present invention is in a sheet caliper gauge. In the art relating to sheet calipering, it is known to measure the thickness of a moving sheet by means of a calipering element floating on a film of air above the surface of the sheet at a constant distance therefrom. U.S. Pat. No. 1,946,924, issued Feb. 13, 1934 to A. Allen et al., discloses, in one embodiment, a caliper gauge of this type wherein a disc-shaped head is maintained a constant distance from a sheet passing over a sheet-supporting roll. A disadvantage of this system is that the sheet tends to vibrate or flutter as it passes over the roll, causing the output from the transducer circuit to be erroneous.

U.S. Pat. No. 3,617,872, issued Nov. 2, 1971 to J. J. Horn et al., discloses a caliper head which floats above a sheet being transported over a sheet support having a flat surface. Suction is applied to the sheet through openings in the surface to maintain the sheet flush against the surface. The source of suction, a vacuum pump, is connected to a negative pressure chamber in the interior of the sheet support, which in turn communicates with the surface openings. To obtain a representative sampling of thickness across the sheet, the gauge system is arranged so as to traverse the sheet in back-and forth movements. Whereas the vacuum pump described in the preferred embodiment of this patent is included in the traversing part of the gauge system, in a commercial embodiment the vacuum pump is positioned off-sheet and connected to the negative pressure chamber in the sheet support via a long flexible hose. A disadvantage of these suction-producing arrangement is that foreign matter such as dust, fibers, and water is drawn off the sheet and into the hose and vacuum pump. A coiled extensible hose, which is commonly used with the commercial traversing caliper gauges, accumulates the waste matter in its coils, resulting in increased resistance to the flow of air and reduced suction, so that the suction eventually becomes insufficient to prevent sheet flutter. Thus the hose must be removed periodically for cleaning or replacement. The passage of this foreign matter into the suction pump may cause damage to the pump, so that the pump may have to be serviced or replaced periodically, at substantial time and/or equipment cost.

U.S. Pat. No. 3,586,972, issued June 22, 1971 to H. W. Tulleners, assigned to the assignee of the present application, discloses, in one embodiment, a gauge for measuring a particular property of a sheet comprising a hood-enclosed sensing means maintained in contact with the sheet by suction applied to the sheet through the hood. That this gauge has a very low incidence of sheet flutter is attributable in part to the applied suction. The efficiency of the suction source in this gauge may be diminished, however, by the gradual accumulation of debris within the suction source itself or in structure such as a flexible hose joining the suction source with the hood as, for example, when the former is situated at a position off-sheet.

SUMMARY OF THE INVENTION

The present invention provides an improved gauge including means for maintaining a relatively constant positional relationship between a sheet and a gauging member including a suction source which is not susceptible to frequent clogging, which does not require frequent removal or replacement, and which is inexpensive and relatively simple in construction. The arrangement provides that foreign matter which is drawn off the sheet by the suction source is disposed of in a straightforward and effective manner, so that it does not interfere with the proper functioning of the apparatus. That the present invention solves the problem of reduced efficiency of the suction-producing means as a result of clogging from foreign matter originating from the sheet material being measured will be apparent from a reading of the description which follows.

In accordance with one preferred embodiment of the invention, an air caliper gauge for measuring a particular property, such as thickness, of sheet material comprises an element floating on an air film at a constant distance above the sheet and a sheet support or guide member on the other side of the sheet. The floating element and the support member may together form part of a transducer circuit for providing an indication of the particular property. Alternatively, the floating element alone may comprise a transducer circuit.

In a preferred embodiment for measuring the thickness of a traveling material sheet, the floating element includes a proximity sensor and the support member contains electrically conductive material with which to complete a transducer circuit whose inductance varies with the distance between the sensor and the support member. To ensure that this distance varies solely in response to changes in sheet thickness, the moving sheet is maintained in substantial contact with the support member at all times without sheet vibration or flutter. This is accomplished by applying suction to a portion of the sheet through apertures in the surface of the support member, which apertures communicate with a gas-confining chamber within the support member having a negative gas pressure.

Negative gas pressure within the chamber is produced by a system operating according to the Venturi principle comprising structure in the form of gas pressure reducing means responsive to a positive fluid pressure source. In a preferred embodiment, the fluid pressure source is a source of compressed air. The Venturi system communicates with a venting orifice through which the air flow is discharged from the chamber. The stream of air through the Venturi system pulls gas from the chamber into the Venturi system and out through the venting orifice, creating a drop in the gas pressure within the chamber relative to that at the surface of the support member. Gas from outside the chamber is drawn into the chamber through the apertures in the surface of the support member and the resulting suction maintains the sheet squarely against the support member surface. Moisture, dust, and other foreign material entering the support member chamber through the apertures are ejected from the chamber via the venting orifice as part of the air stream. As a result, such foreign material does not accumulate to the detriment of the efficiency of the suction-producing means, and substantial equipment and production savings are attained over the air gauge systems of the prior art.

OBJECTS OF THE INVENTION

Accordingly, it is an object of the present invention to provide an improved sheet material measuring system wherein a relatively constant positional relationship is maintained between a traveling sheet and a gauging or support member by suction-producing means whose efficiency is not adversely affected by foreign material originating from, or carried by, the sheet or otherwise present in the environment.

It is another object of the present invention to provide an improved sheet material measuring system having a small, light-weight and integrally mounted suction-producing means, thereby eliminating any need for unwieldy suction hoses or traversing, motor-driven fans and the like.

It is also an object of the present invention to provide an improved sheet material measuring system having means for straight-forwardly ejecting foreign material from the suction-producing device thereof, thereby reducing the tendency for foreign material to collect in the apparatus and to interfere with the accuracy of the measuring system.

It is a further object of the present invention to provide an improved sheet material measuring system which requires no moving parts in the suction-producing device thereof and which is therefore economical to construct, and easy and inexpensive to maintain.

Further objects and advantages will become apparent from the following detailed description of the preferred apparatus according to the invention, taken in conjunction with the appended drawing.

BRIEF DESCRIPTION OF THE DRAWING

The single FIGURE is a cross-sectional view of a portion of a sheet material measuring system according to a preferred embodiment of the invention.

SHEET MATERIAL CALIPERING SYSTEM

With reference now to the drawing, a portion of a sheet material caliper gauge system is shown, according to a preferred embodiment of the present invention. A sheet supporting means 2 is illustrated together with an element 1 floating on a gas film 3 above the surface of a sheet or web of material 4 to be measured. Floating element 1 and sheet supporting means 2 constitute part of the traversing portion of the gauging system.

The details of the floating element 1 are described in the aforementioned copending application; however, a brief description of one embodiment of element 1 will serve to explain it function within the gauge system shown.

In a preferred embodiment, floating element 1, shown in cross-section in the drawing, includes a rounded bearing surface 31 disposed within a cylinder 30 having an internal cylindrical bearing surface 37. Cylinder 30 is supplied with gas, such as air, at positive pressure from an external source. Preferably the gas is filtered and its pressure closely regulated. A portion of this gas flows between bearing surfaces 31 and 37 maintaining bearing surface 31 spaced from bearing surface 37. In addition, gas flows into gas inlet chamber 34 and hence into annular gas distribution chamber 36 from which it is directed through a plurality of tubular channels 38 each having a discharge orifice 40. Discharge orifices 40 are arranged in an annular pattern on the surface of element 1 adjacent sheet 4. Discharge orifices 40 are situated nearly halfway between the center and the periphery of the bottom surface of element 1, preferably closer to the periphery than to the center. Gas distribution chamber 36 and channels 38 are angled downward and outward from gas inlet chamber 34 towards the periphery of the bottom surface of element 1. Gas flowing from discharge orifices 40 forms a gas bearing or film 3 between element 1 and sheet 4, thereby supporting element 1 at a predetermined and constant distance from sheet 4.

Centrally located within element 1 is a proximity sensor 35 which is connected via an electric cable 33 with a proximity circuit (not shown) which may be, for example, a Bently Nevada 3000 Series (available through the Bently Nevada Corporation, Minden, Nev.), or the equivalent. Proximity sensor 35 is responsive to electrically conductive material in the upper portion 5 of sheet supporting means 2 to be described in more detail below, with the result that variations in the distance between sensor 35 and upper portion 5 are reflected as measurable variations in the inductance of the proximity circuit of which sensor 35 is a part. Because sensor 35 is maintained a constant distance from sheet 4, any variation in the inductance of the proximity circuit will be attributable solely to a change in the thickness of sheet 4.

SHEET SUPPORTING MEANS

Sheet supporting means 2, shown in cross-section comprises an upper portion 5 having a plurality of apertures 6 therein, a side portion 7, and bottom portion 8, these portions together defining a gas-confining chamber 10. Apertures 6 communicate between gas-confining chamber 10 and the exterior surface of upper portion 5. If viewed from above, upper portion 5 may have a generally circular shape, with apertures 6 spaced in an annular pattern closely adjacent its periphery.

A fluid inlet pipe 12, secured to an adapter 11 in the wall of side portion 7 for receiving a suitable fluid pressure fitting, is bent at a right angle and terminates in a nozzle 13 directed downwards between the lower walls of bottom portion 8. Fluid inlet pipe 12 is supplied with fluid, such as air, at positive pressure with respect to the pressure in gas-confining chamber 10 from an external source (not shown) such as an air compressor. Preferably, the air is filtered, and its pressure regulated.

The lower walls of bottom portion 8 define a sleeve 9, into which is fitted a cylindrical member 20 which, together with spider means 17, serves as a support for one or means 15 in the form of inverted hollow truncated cones. A frusto-conical means 15 is positioned so that its large end receives fluid, such as air, streaming from nozzle 13. Due to the high velocity of the fluid passing through the space within the open large end of frusto-conical means 15, a decrease in the pressure in this region results, in accordance with Bernoulli's principle, causing air or other ambient gas to be drawn from chamber 10 into the large end of frusto-conical means 15 through the opening between nozzle 13 and frusto-conical means 15. As air is withdrawn from chamber 10, the resulting negative pressure relative to the ambient pressure causes air to be drawn into chamber 10 through apertures 6 in upper portion 5 upon which moving sheet 4 is supported. The suction applied to sheet 4 is adjusted by means of a hand valve or pressure regulator (not shown) so as to maintain sheet 4 flush against the upper portion 5 without hampering its progress.

To provide sufficient volume of air movement through apertures 6, additional frusto-conical means 15 are preferably supplied so as to reduce the pressure within chamber 10 in several stages. The large end of each frusto-conical means 15 receives a mixture of the air or other ambient gas and the air or other fluid supplied from the compressor or other source. This mixture issues from the small end of the immediately preceding frusto-conical means 15. The several frusto-conical means 15 are aligned coaxially and increase in size in the direction of the fluid flow from nozzle 13. The largest frusto-conical means 15 discharges into the interior of cylindrical member 20, comprising a restricting portion 19 and a venting portion 21 which together release the mixture to ambient conditions gradually in order to reduce noise and to increase the efficiency of the Venturi system. Frusto-conical means 15 may have a convex inner surface to increase the efficiency of the gas pressure-reducing action of the Venturi system. The multiple staging of the several frusto-conical means 15 may be similar to that described with respect to a multi-stage pump in the *Mechanical Engineers' Handbook* ed. by Lionel S. Marks, McGraw-Hill Book Co., New York, 5th ed. 1951, page 1832.

Foreign matter, such as water vapor, dust, fibers, and other particulate or condensable material originating from sheet 4 or the ambient environment is drawn into chamber 10 through apertures 6. This aids the normal wiping action of the sheet in preventing such matter from accumulating on the exterior surface of upper portion 5 and causing an erroneous thickness measurement of sheet 4. Once having passed into chamber 10, the foreign matter is effectively discharged to the outside through venting portion 21 of cylindrical member 20. This helps to prevent such foreign matter from clogging or otherwise inhibiting the suction-producing action associated with sheet support 2.

The debris which is effectively dispelled from the exterior surface of upper portion 5 and from chamber 10 cannot impair the accuracy of the sheet calipering system, so improved performance is obtained. Similar advantages may be achieved in the sheet material gauging system of U.S. Pat. No. 3,586,972, referred to above, when such gauging system is modified according to applicant's teaching herein.

The Venturi system comprising frusto-conical means 15 and cylindrical member 20 has no moving parts, is relatively simple to construct, is compact and light in weight, and may be easily withdrawn from the sleeve 9 of bottom portion 8 for cleaning if necessary. Because the suction-producing means of the sheet material measuring system of the present invention is light and compact, it may be mounted as an integral part of the traversing portion of the measuring system without diminishing its sensitivity or necessitating structural reinforcement. Moreover, there is no need for an unwieldy suction hose connection between the traversing portion and a suction source located off-sheet. Advantageously, a fluid pressure supply hose of the type suitable for connection to fluid inlet pipe 12 may be substantially smaller in diameter, lighter in weight and much less fragile, thus requiring less hose-supporting structure, less initial cost, and less maintenance.

It will be apparent to one skilled in the art that numerous modifications may be made to the invention herein shown and described without departing from the scope of the invention as recited in the appended claims. For example, sheet support 2 may be positioned to overlie sheet 4, and floating element 1 may be positioned under the sheet 4. Any suitable liquid or gas may be used as the actuating fluid in the Venturi system.

What is claimed is:

1. Apparatus for measuring a property of a traveling material sheet, comprising means having a surface to be maintained in contact with a portion of said sheet and a gas-confining chamber that communicates gas to said surface and foreign matter from said surface to said gas-confining chamber, a positive pressure source of fluid coupled to said chamber, gas pressure-reducing means within said chamber responsive to said fluid pressure source for providing suction at said surface to maintain said sheet portion in close contact with said surface, said gas pressure-reducing means including a venting orifice through which foreign matter entering said gas-confining chamber from said fluid pressure source and through said surface may be substantially discharged, and sensing means responsive to said sheet held in contact with said surface for providing an indication of said property.

2. Apparatus as in claim 1, wherein said gas pressure-reducing means comprises means responsive to said fluid pressure source for expanding said fluid, whereby the gas pressure inside said chamber communicating to said surface is reduced relative to that outside said chamber.

3. Apparatus as in claim 2, wherein said gas pressure-reducing means comprises means responsive to said fluid pressure source for alternatively expanding and compressing said fluid, the overall amount of expansion exceeding the amount of compression, whereby the gas pressure inside said chamber communicating to said surface is reduced relative to that outside said chamber.

4. Apparatus as in claim 3, wherein said fluid pressure source has a fluid outlet in said chamber and said gas pressure-reducing means comprises structure in the form of a hollow truncated cone having a large opening at one end and a small opening at the other end, the large opening of said structure receiving fluid from said fluid outlet, the small opening of said structure communicating with said venting orifice, whereby the pressure of said fluid entering said structure is reduced thereby effecting a reduction in the gas pressure inside said chamber communicating to said surface relative to that outside said chamber.

5. Apparatus as in claim 4, wherein said gas pressure-reducing means comprises additional structure in the form of one or more additional hollow truncated cones, said hollow truncated cones being of graduated sizes and arranged substantially coaxially, the small opening of each additional hollow truncated cone communicating with the large opening of a successive hollow truncated cone in the direction of fluid flow, the sizes of said hollow truncated cones increasing in the direction of fluid flow, whereby the gas pressure inside said chamber is reduced in several stages.

6. Apparatus as in claim 4, wherein the inner surface of said hollow truncated cone is complex.

7. Apparatus as in claim 5, wherein the inner surface of said hollow truncated cones are convex.

8. Apparatus as in claim 1 for measuring the thickness of said sheet, comprising support means having said surface on a face thereof, means for locating said sensing means and said support means on opposite sides of the said sheet, and means providing a gas film interposed between said sensing means and said sheet whereby said sensing means is maintained at said constant distance from said sheet to provide an indication of the thickness of said sheet which is proportional to the distance between said sensing means and said support means.

9. Apparatus as in claim 8, wherein said gas pressure-reducing means comprises means responsive to said fluid pressure source for alternatively expanding and compressing said fluid, the overall amount of expansion exceeding the amount of compression, whereby the gas pressure inside said chamber communicating to said surface is reduced relative to that outside said chamber.

10. Apparatus as in claim 9, wherein said fluid pressure source has a fluid outlet in said chamber and said gas pressure-reducing means comprises structure in the form of a hollow truncated cone having a large opening at one end and a small opening at the other end, the large opening of said structure receiving fluid from said fluid outlet, the small opening of said structure communicating with said venting orifice, whereby the pressure of said fluid entering said structure is reduced thereby effecting a reduction in the gas pressure inside said chamber communicating to said surface relative to that outside said chamber.

11. Apparatus as in claim 10, wherein the gas pressure-reducing means comprises additional structure in the form of one or more additional hollow truncated cones, said hollow truncated cones being of graduated sizes and arranged substantially coaxially, the small opening of each additional hollow truncated cone communicating with the large opening of a successive hollow truncated cone in the direction of fluid flow, the sizes of said hollow truncated cones increasing in the direction of fluid flow, whereby the gas pressure inside said chamber is reduced in several stages.

12. Apparatus as in claim 10, wherein the inner surface of said hollow truncated cone is convex.

13. Apparatus as in claim 11, wherein the inner surface of said hollow truncated cones are convex.

14. Apparatus of claim 1, wherein said fluid pressure source has a fluid outlet in said chamber and said gas pressure-reducing means comprises structure in the form of a hollow truncated cone having a large opening at one end and a small opening at the other end, the large opening of said structure receiving fluid expanding from said fluid outlet, the small opening of said structure communicating with said venting orifice, whereby the pressure of said fluid entering said structure is reduced thereby effecting a reduction in the gas pressure inside said chamber communicating to said surface relative to that outside said chamber.

15. Apparatus of claim 14, wherein said gas pressure-reducing means comprises additional structure in the form of one or more additional hollow truncated cones, said hollow truncated cones being of graduated sizes and arranged substantially coaxially, the small opening of each additional hollow truncated cone communicating with the large opening of a successive hollow truncated cone in the direction of fluid flow, the sizes of said hollow truncated cones increasing in the direction of fluid flow, whereby the gas pressure inside said chamber is reduced in several stages.

* * * * *